United States Patent [19]

Runkle

[11] Patent Number: 4,498,616
[45] Date of Patent: Feb. 12, 1985

[54] METHOD FOR FRACTURING A TUBE SHEET

[75] Inventor: Charles J. Runkle, Wake County, N.C.

[73] Assignee: Monsanto Company, St. Louis, Mo.

[21] Appl. No.: 553,591

[22] Filed: Nov. 21, 1983

[51] Int. Cl.³ .............................................. B26F 3/06
[52] U.S. Cl. ......................................... 225/1; 29/413; 225/2; 225/93.5
[58] Field of Search ....................... 225/1, 2, 93, 93.5; 29/413–415

[56] References Cited

U.S. PATENT DOCUMENTS

| | | | |
|---|---|---|---|
| 3,318,500 | 5/1967 | Swanson | 225/93.5 X |
| 3,406,886 | 10/1968 | Wesel et al. | 225/93.5 X |
| 3,475,229 | 10/1969 | Green et al. | 225/1 X |
| 3,503,288 | 3/1970 | Swartling | 82/48 |
| 4,183,283 | 1/1980 | Danos et al. | 90/11 |
| 4,271,740 | 6/1983 | Yamazaki et al. | 83/592 |
| 4,369,605 | 1/1983 | Opersteny et al. | 51/319 |

*Primary Examiner*—Frank T. Yost
*Attorney, Agent, or Firm*—R. L. Broad

[57] ABSTRACT

A process for severing a tube sheet made from a polymeric material to expose bores of hollow fibers having the ends thereof embedded in the tube sheet, with the tube sheet having a cylindrical configuration and a stress raiser extending around the periphery thereof, wherein a ring having a lower coefficient of expansion than the material of the tube sheet is positioned to encircle the tube sheet at a location adjacent to the stress raiser. The tube sheet is then heated to expand it to the point where stress causes the tube sheet to fracture off that portion of the tube sheet encircled by the ring from the remainder of the tube sheet to expose bores of the fibers.

6 Claims, 3 Drawing Figures

METHOD FOR FRACTURING A TUBE SHEET

BACKGROUND OF THE INVENTION

1. Field of The Invention

This invention relates to methods for severing tube sheets to expose the bores of hollow fibers embedded therein.

2. Prior Art

In the making of one type of membrane gas separator the end of a bundle of hollow fiber membranes is placed in a cylindrical mold and a liquid casting resin is poured into the mold and cured. The configuration of the mold is such that the solidified casting can be used as a tube sheet in a cylindrical shell. It is then necessary to cut the tube sheet to expose bores of the hollow fibers so that a gas can pass through the tube sheet via the fiber bores.

Several methods have been proposed for cutting the tube sheet but none has been entirely satisfactory. The primary problem is that most methods used for cutting the tube sheet results in many of the hollow fibers being smeared such that the fiber bores are closed.

U.S. Pat. No. 3,503,288 discloses a method for cutting hollow plastic filaments embedded in a solid plastic matrix to expose the bores of the filaments wherein the end of the tube sheet is brought into contact with a cutter and is then rotated so that the cutter trims the end of the tube sheet. This patent states that attempts have been made to fracture the tube sheets by the use of a controlled bending force or a shaped explosive charge. The patent further states that, when an attempt is made to fracture a tube sheet larger than two inches in diameter, the resultant fracture is erratic, difficult to predict and usually damages beyond repair the integrity of the seal between the cast wall, the hollow filaments and the casing in which the tube sheet is mounted.

U.S. Pat. No. 4,183,283 discloses that a tube sheet can be severed in any suitable manner and then a thin layer of the tube sheet is removed by using a knife blade edge to scrape the severed face of the tube sheet and open the bores of hollow fibers embedded in the tube sheet.

U.S. Pat. No. 4,271,740 discloses apparatus for cutting a tube sheet having a fiber bundle embedded therein, the apparatus being provided with a pair of blades positioned at different angles.

U.S. Pat. No. 4,369,605 discloses the opening of bores in a cast tube sheet by severing the tube sheet and then grit-blasting the severed face of the tube sheet to open the fiber bores.

SUMMARY OF THE INVENTION

A process for severing a brittle polymeric tube sheet to expose bores of hollow fibers embedded in the tube sheet wherein the tube sheet is provided with a circumferential stress raiser and compressive forces are applied to the tube sheet to fracture off a portion of the tube sheet at the stress raiser to expose the bores of the hollow fibers embedded in the tube sheet.

DETAILED DESCRIPTION OF THE INVENTION

Figure 1:
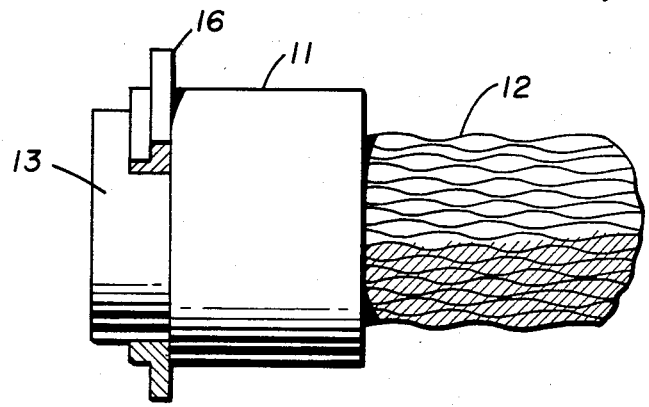
FIG. 1 of the drawings shows a side view of a tube sheet which can be severed by the process of the instant invention.

Referring now in detail to the drawings, there is shown in FIG. 1 a generally cylindrical tube sheet 11 made from a brittle polymeric material such as an epoxy and having embedded therein a bundle 12 of gas permeable hollow fiber membranes. The tube sheet 11 which is cast from a suitable curable or cross-linkable resin, is provided with a generally cylindrical protuberance 13 extending from and concentric with the tube sheet 11, the protuberance 13 being an integral part of tube sheet 11. The junction between the tube sheet 11 and the protuberance 13 serves as a stress raiser.

The tube sheet is cast from a polymeric material such as those disclosed in U.S. Pat. No. 4,183,890. In order to carry out the process of this invention the tube sheet must be sufficiently brittle that it can be fractured by the application of compressive forces. Such a polymeric material will have sufficient brittleness if it has a Shore A hardness of at least about 80.

A ring 16, preferably made from a metal, such as ordinary carbon steel, having a coefficient of expansion less than the coefficient of expansion of the material of the tube sheet 11 is slipped onto the protuberance 13 to the position shown in FIG. 1, the ring 16 being just large enough to be manually positioned on the protuberance 13. The ring 16 may be made from any metal or other material having a coefficient of expansion less than the material of the tube sheet and a sufficient strength that it will not be broken by expansion of the tube sheet.

The tube sheet 11 with the protuberance 13 and the ring 16 are then placed in a heated environment to raise the temperature of these parts. Increasing temperatures causes the tube sheet 11 to expand at a faster rate than the ring 16 to cause compressive stress on the protuberance 13 at a location adjacent to the stress raiser.

Figure 2:
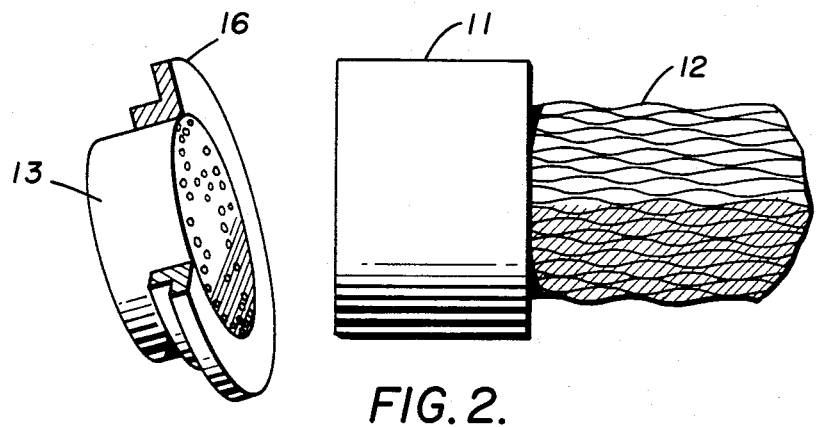
FIG. 2 is a side view showing the manner in which a portion of the tube sheet is fractured off from the remainder of the tube sheet to expose bores of fibers embedded in the tube sheet.

As the temperature of the tube sheet is increased, compressive forces on the protuberance will increase and be concentrated at the stress raiser until the point at which these concentrated forces cause the protuberance 13 to fracture off the tube sheet as best shown in FIG. 2. Inasmuch as the fibers extend into the protuberance 13, this will break off those portions of the fibers in the protuberance 13 to leave almost 100 percent of the fiber bores exposed.

Figure 3:
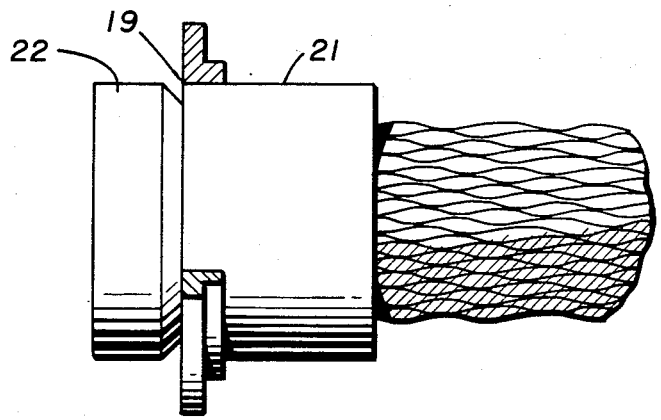
FIG. 3 is a side view showing a second type of tube sheet with which the fracturing process of this invention can be used to expose bores of fibers embedded in the tube sheet.

FIG. 3 shows a second embodiment of the invention wherein the stress raiser is in the form of a groove 19 in a tube sheet 21. In this case, the compressive stresses caused by heating the tube sheet are concentrated at the groove 19 and cause a portion 22 of the tube sheet to fracture off from the remainder of the tube sheet to leave the fiber bores open.

This process of severing a tube sheet can be carried out by an unskilled operator and results in almost 100 percent of the fiber bores being spun. Tube sheets over 20 centimeters in diameter can be cleanly fractured without damage to other parts of the tube sheet. The process can also be used for severing polymeric tube sheets of the type used in some heat exchangers.

I claim:

1. A process for severing a tube sheet made from a polymeric material to expose bores of hollow fibers having the ends thereof embedded in the tube sheet, said tube sheet having a cylindrical configuration and a stress raiser extending around the periphery thereof in a plane substantially perpendicular to the axis of the tube sheet comprising
- (a) positioning a ring on the tube sheet to encircle a portion of said tube sheet at a location adjacent to the stress raiser, said ring having a coefficient of expansion less than the coefficient of expansion of said polymeric material, and
- (b) heating the tube sheet to expand said tube sheet to the point where stress causes the tube sheet to fracture off said portion from the remainder of the tube sheet to expose the bores of the fibers.

2. The process of claim 1 wherein the stress raiser is in the form of circumferential groove in the tube sheet.

3. The process of claim 1 wherein the stress raiser is formed by the junction of the cylindrical tube sheet and a cylindrical protuberance concentric with and extending from the end of the tube sheet, said protuberance being integral with said tube sheet.

4. The process of claim 3 wherein the ring is made from metal and is placed on said protuberance in contact with the end of the tube sheet.

5. The process of claim 3 wherein the polymeric material is an epoxy resin.

6. The process of claim 5 wherein the polymeric material has a Shore A hardness of at least 80.

* * * * *